Patented June 19, 1951

2,557,294

UNITED STATES PATENT OFFICE 2,557,294

COFFEE EXTRACT ENRICHED WITH EXTRA FLAVOR

John L. Kellogg, Chicago, Ill.; Helen Louise Kellogg executrix of said John L. Kellogg, deceased No Drawing. Application April 13, 1949, Serial No. 87,355

8 Claims. (Cl. 99—71)

This invention relates to an improved coffee extract in the form of a dry powder and to certain improved steps in a method of producing the same.

A principal object of the invention is to provide a coffee extract in the form of an improved dry product, for example a powder, enriched with additional flavoring and aromatic principles.

Another object is to provide an improved method of incorporating the additional flavoring substances in the coffee extract prior to the drying of the product, but in such manner that the major portion of the added flavor is retained in the dried product and thereafter liberated in the liquid beverage made by dissolving the dried extract in hot or cold water.

It has been proposed, heretofore, to enrich dried coffee extract by adding thereto additional flavoring to replace the flavoring substances which are lost or converted during the extraction of the water solubles from the coffee and during the subsequent concentration and drying of the liquid extract. The added flavoring is usually mixed with the dried product (applicant's prior Patent 2,350,903, dated June 6, 1944). In some instances the additional flavoring has been added to the extract prior to the drying of the product, but when this is done there is considerable loss of the flavoring substances by evaporation and conversion during the drying operation.

The present product and method of producing the same contemplates introducing into the product additional flavoring substances prior to the drying operation, but it is distinguished from the prior art in that a carrier, which is not necessarily soluble in water, is thoroughly impregnated with the flavoring oils and is introduced into the liquid extract before the drying operation, the carrier serving to protect and conserve the highly fugitive flavoring substances during the drying operation, but will liberate them in hot or cold water used to dissolve the product to form a liquid beverage.

The carrier body and the flavoring substance utilized in the present invention is composed of the foots normally flushed from the roasted coffee during the extraction of coffee oil therefrom.

When extracting coffee oil from roasted coffee beans the roasted coffee beans are first heated to approximately 150° Fahrenheit and thereafter subjected to high pressure and cutting action in a suitable machine for expressing the oil. The pressure applied to the coffee (approximately 25,000 to 30,000 pounds) ruptures the cellular structure of the coffee and expels the coffee oil therefrom. The expelled coffee oil carries with it some cellular particles and certain solids and semi-solid particles developed during the roasting of the coffee, all of which particles are referred to generally as "foots." The coffee oil, thus obtained, has many uses, but it is used principally as flavoring for coffee extract and confections. The foots have been heretofore regarded as a waste by-product and, therefore, have been filtered from the oil and discarded.

I have discovered that the foots contained in the oil extract from roasted coffee is more satisfactory for use as a flavoring substance than the pure oil, since the foots are highly impregnated with the coffee flavors developed during the roasting, whereas the pure coffee oil is somewhat sharp to the taste. The foots, before being used, are preferably ground until the particles thereof are sufficiently fine to remain in suspension in a relatively light solution. For example, a liquid beverage formed by dissolving the soluble coffee extract in water. I have also found that the said foots, when prepared in the manner hereinafter disclosed, can be incorporated in a liquid extract of coffee preliminary to the drying thereof and that when so incorporated and dried with the coffee solubles, will retain, after the drying operation, the highly flavored substances contained therein, whereby the flavor and aroma so contained in the foots will be liberated when the coffee extract is dissolved and add their flavor to the coffee beverage thus formed.

According to my improved method, the foots contained in the coffee oil extract from roasted coffee is preferably passed through a paint mill or other similar grinding machine to reduce the size of the particles so as to form a very smooth paste. This paste may be used to impart a coffee flavor to confections and other substances, but for the present invention it is utilized to add flavor to the water soluble extracts of coffee. In the present case it is mixed with a quantity of dried coffee extract and the total mixture is then thoroughly mixed with a heavy liquid extract of coffee. The thorough mixing of the paste-like flavoring substance with the liquid coffee extract is obtained preferably by homogenizing the mixture at suitable pressure. The homogenization of the mixture breaks up the fatty particles and also thoroughly mixes the fibers and semi-solid particles of the foots through the entire batch of coffee extract. The coffee extract with the added flavoring is then dried to form a dry powder product.

I have found that it is also practical to add to the foots contained in the oil a quantity of finely pulverized roasted coffee. The coffee fibers thus added to the original foots obtained absorb the surplus oil from the foots, since the foots, when separated from the expressed oil will ordinarily contain 50% to 70% oil. In order to prevent rancidity, a small quantity of hydrogenated vegetable oil may be added to the paste. The amount of hydrogenated oil may vary from 5% to 20%. The percentage indicated is not critical but merely a convenience.

In order to insure that the oils containing flavor, will be uniformly dispersed in a liquid beverage made by dissolving the enriched powdered product in water, an emulsifying agent, preferably a small quantity of lecithin, may be added to the paste flavoring material. However, the use of an emulsifying agent is optional since the homogenization of the material will serve to disperse the unsoluble particles throughout the material and the said particles will normally be sufficiently fine to remain in suspension in the liquid beverage for a long period of time.

The paste thus obtained may be mixed directly with 18° Baumé coffee extract, in which case the added flavoring material is thoroughly distributed throughout the extract. However, I prefer mixing the paste with a quantity of powdered coffee extract so that the dry extract will absorb any surplus oil contained in the paste. However, in either case the mixing with the 18° Baumé extract is carried out at temperature of approximately 140° Fahrenheit and the material is thoroughly homogenized.

*Example No. 1*

100 pounds of roasted coffee will yield approximately 9½ pounds of oil and foots. This mixture as obtained from the extractor will ordinarily contain 20% foots. After the foots are separated from the oil, they will contain 50% to 70% of coffee oil; the oil serving, when the foots are reground as hereinabove indicated, to form a smooth paste. If desired, the oil content in the foots can be reduced by using a pressure filler in the separation. The paste is mixed with the dry coffee extract in proportions of 1 part of paste to 8 parts of dry coffee extract. It is then heated to approximately 140° Fahrenheit and mixed with said 18° Baumé extract in proportions of 3 to 30 pounds of the flavored soluble coffee powder to 33⅓ gallons of the 18° Baumé extract.

As an alternative, 1 to 10 pounds of the coffee flavored paste, without the addition of dried coffee extract, may be added direct to 33⅓ gallons of 18° Baumé at said temperature of 140° Fahrenheit and homogenized and thereafter dried.

*Example No. 2*

Twenty (20) to thirty (30) pounds of finely ground roasted coffee is added to 80 to 70 pounds of coffee oil. This material is preferably passed through a paint mill or other suitable grinding apparatus to reduce the material to a thin paste. This paste is then mixed with 18° Baumé coffee extract in the proportion of 10 to 30 pounds of the coffee paste to 33⅓ gallons of 18° Baumé coffee extract containing 3 pounds of coffee solids per gallon of extract. Both the coffee extract and the paste should be heated to approximately 140° Fahrenheit and the extract should be added gradually to the coffee flavored paste until a smooth mixture is obtained. The mixture is then homogenized and dried.

The coffee flavored paste of Examples No. 1 and No. 2 is illustrated as a flavoring substance for fortifying soluble coffee extract, but the paste per se is suitable for use as a flavoring agent for ice cream, candy, bakery goods, cereals, cereal beverages and many other products.

*Example No. 3*

The coffee flavored paste, as previously described may be composed of a mixture of foots and the coffee oil contained therein either with or without the addition of finely ground roasted coffee. Also finely ground roasted coffee soaked and reground in vegetable oils, either coffee oil or other vegetable oil provides a paste which is suitable for many purposes including added flavoring for coffee extracts and flavoring for confections. According to this example, 100 parts of coffee foots, or finely ground roasted coffee, is added to 100 parts of coffee oil or other vegetable oil. To the above paste-like mixture is added 25 to 50 parts of powdered soluble coffee extract. These proportions are not critical and may be varied if desired. For example, the paste-like material may comprise the following proportions:

25 parts of coffee foots or finely ground roasted coffee
25 parts of coffee oil
50 parts of powdered soluble coffee extract

*Example No. 4*

A further variation in the product may be obtained which will impart a true coffee flavor which may be made by mixing 1 to 20 parts of coffee oil including the foots contained therein with 99 to 80 parts of powdered soluble coffee extract. In such case a major portion of the added flavor is contained in the insoluble coffee particles as distinguished from the mere impregnating of the powdered soluble coffee extract with the oil. This product therefore remains free of lump.

When lecithin is introduced into the product, it is heated to approximately 140° Fahrenheit and mixed with soluble coffee powder specified in the above examples in the proportion of 45 grams of lecithin to 8 pounds of dry coffee extract containing 1% of coffee oil and foots. If the dry coffee extract contains a larger percentage of coffee oil and foots, the quantity of lecithin used is proportionately increased. This mixing step is preliminary to the introduction of the heavy coffee extract into the coffee flavored paste material, according to the several examples herein specified. As an alternative, the lecithin may be added to the coffee oil and foots preliminary to the grinding thereof to form said coffee flavored paste, the lecithin and the coffee oil and foots being heated to 140° Fahrenheit to facilitate the mixing thereof; the mixture being on the basis of 1% lecithin to 99% of coffee oil.

When hydrogenated oil is added to the mixture, it is used in proportions of about 1 to 4, by weight, of the other oil contained in the mixture. This amount of hydrogenated oil is sufficient to prevent racidity of the product as a whole.

While my invention is illustrated herein in connection with certain preferred examples, it should be understood that the examples used herein are intended merely as illustrations and not as limitations.

I claim:

1. The method of enriching dry soluble coffee extract with added coffee flavor which comprises separating the foots from natural coffee oil, grinding the foots in the oil contained therein to form a smooth paste, thoroughly mixing a quantity of the paste with a quantity of heavy liquid coffee extract and thereafter drying the mixture to provide a powder.

2. The method of enriching a dry soluble coffee extract with added coffee flavor which comprises adding to the foots contained in natural coffee oil a quantity of finely ground roasted coffee, the oil content of the mixture being sufficient to saturate the quantity of ground coffee added to the mix, regrinding the mixture to form a smooth paste, mixing a quantity of said paste with a quantity of 18° Baumé coffee extract and thereafter drying the mixture.

3. The method of enriching dry soluble coffee extract as defined in claim 1 characterized in that the paste is mixed with the liquid coffee extract in proportions of 1 part of paste to 8 parts of dry coffee extract.

4. The method of enriching dry soluble extract as defined in claim 2 characterized in that the paste is mixed with the liquid coffee extract in proportions of 1 part of paste to 8 parts of dry coffee extract.

5. The method of enriching soluble coffee extract with added coffee flavor including the steps of adding 20 to 30 pounds of finely ground roasted coffee to 80 to 70 pounds of coffee oil, grinding this mixture to form a smooth paste, heating the paste to a temperature of 140° Fahrenheit, adding to the paste a quantity of 18° Baumé coffee extract having 3 pounds of solids per gallon and heated to a temperature of 140° Fahrenheit, the coffee extract being added gradually to the paste, thereafter homogenizing the mixture and drying the same.

6. The method of enriching soluble coffee extract with added coffee flavor including the steps mixing 100 parts, by weight, of coffee oil foots with 100 parts of vegetable oil, grinding the mixture to a smooth paste, add to the paste 25 to 50 parts of powdered soluble extract of coffee, homogenize the mixture thus formed and thereafter thoroughly intermix the above with a heavy liquid coffee extract, again homogenize the mixture and thereafter dry the same.

7. The method of enriching a dry coffee powder with added coffee flavor which includes mixing 1 to 20 parts, by weight, of coffee oil including the foots contained therein, with 99 to 80 parts of powdered soluble coffee extract, the coffee foots serving as carrier bodies for a major portion of the coffee oil added.

8. The method of enriching soluble coffee extract according to claim 1 characterized by the addition to the coffee paste a quantity of lecithin equal substantially, by weight, to .01% of the soluble coffee extract to be enriched.

JOHN L. KELLOGG.

REFERENCES CITED

The following references are of record in the file of this patent:

UNITED STATES PATENTS

| Number | Name | Date |
| --- | --- | --- |
| 1,214,875 | Aslund | Feb. 6, 1917 |
| 1,271,761 | Phillips | July 9, 1918 |
| 1,381,706 | Hapgood | June 14, 1921 |
| 1,605,115 | Kellogg | Nov. 2, 1926 |
| 1,716,323 | Rector | June 4, 1929 |
| 1,836,931 | Meyer | Dec. 15, 1931 |
| 1,985,426 | Ragsdale | Dec. 25, 1934 |
| 2,288,284 | Kellogg | June 30, 1942 |
| 2,350,903 | Kellogg | June 6, 1944 |